(12) United States Patent
Hill

(10) Patent No.: X1659
(45) Date of Patent: Feb. 7, 1812

(54) TYPES, MUSIC

(76) Inventor: Uri K. Hill

To all to whom these Presents shall come, Greeting;
I certify that the annexed is a true copy of a Patent granted
to Wm. H. Hill on the 7th February 1826 for his improve-
ment in Musical Types.
In testimony whereof I Henry Clay Secretary of
State of the United States, have hereunto subscri-
bed my name and caused the Seal of the
Department of State to be affixed.
Done at the City of Washington this twenty sixth day
of January A.D. 1827. and of the Independence of
the United States of America the 51st H Clay The Schedule referred to in these Letters Patent and making part
of the same containing a description in the words of the said
Wm. H. Hill himself of his improved Musical Types.

---

Wm. H. Hill hath invented a new kind of music
type improved in its construction & application in the
following particulars.
1st In the separating the type which prints the
note from that which prints the lines.
2nd In the shapes of the notes, and likewise in
application of these shapes to designate the mi, fa, sol,
la, of this country and of England, the, do, re, mi, fa,
sol, la, si, of Italy; or the ut, re, mi, fa, sol, la, si, of France.
3rd In the designating the changes of the mi according
to ours or the English Solmization, and thereby shewing
the changes of the octave by means of these shapes, or
or by any other shape differing from the common shape,
expressing or designating any of the above mentioned
syllables. —
The notes, and lines and spaces are cast separate in order that the notes may be set up without the lines and impressed on ruled or printed lines, or the lines ruled or printed after the notes are printed.

The different shapes of the notes pertain to their heads & are as follows.— A round head represents the mi, an ascending oval the fa, a horizontal oval the sol, and a descending oval the la.— When the fa, sol, la, is repeated a round or square dot is used in the head of the note which completes the seven shapes used to note the seven primitive sounds according to the French and Italian solmization. This type differs from the common music type in the following particulars.—

In the common type, each type contains the lines and spaces together with the note.— In this type the notes and lines are on separate types.—

In the common type, the notes cannot be set without the lines and spaces. In this either the notes or the lines may be set up separately.—

Two of the shapes here given have been used in common music, but were never used to designate the same syllables in ours, or any syllable in the foreign solfeggio.— The round and angular shapes have been used in this country to express the mi, fa, sol, la; but never used to designate the state of the octave when the mi is changed by modulation In the common type the notes can only be impressed together with the lines.— In this type the notes may be impressed on ruled or printed lines, or the lines ruled or printed after the notes are printed.

Witnesses
Wm. [illegible] Hill
Charles Hill

Wm. K. Hill

Exd
[illegible]